(12) United States Patent
Scarborough

(10) Patent No.: US 10,132,606 B2
(45) Date of Patent: Nov. 20, 2018

(54) MARKING TAPE MEASURE

(71) Applicant: Dane Scarborough, Van Nuys, CA (US)

(72) Inventor: Dane Scarborough, Van Nuys, CA (US)

( * ) Notice: Subject to any disclaimer, the term of this patent is extended or adjusted under 35 U.S.C. 154(b) by 190 days.

(21) Appl. No.: 15/308,655

(22) PCT Filed: May 6, 2014

(86) PCT No.: PCT/US2014/036984
§ 371 (c)(1),
(2) Date: Nov. 3, 2016

(87) PCT Pub. No.: WO2015/171120
PCT Pub. Date: Nov. 12, 2015

(65) Prior Publication Data
US 2017/0176160 A1   Jun. 22, 2017

(51) Int. Cl.
*G01B 3/10* (2006.01)

(52) U.S. Cl.
CPC ......... *G01B 3/1084* (2013.01); *G01B 3/1056* (2013.01); *G01B 2003/1089* (2013.01)

(58) Field of Classification Search
CPC .......... G01B 2003/1089; G01B 3/1084; G01B 2003/1053; G01B 3/1041; G01B 3/1056
USPC .................................................. 33/755–771
See application file for complete search history.

(56) References Cited

U.S. PATENT DOCUMENTS

| | | |
|---|---|---|
| 1,216,418 A | 2/1917 | Crogan |
| 1,535,816 A | 4/1925 | Dabney |
| 1,926,581 A | 9/1933 | Clarke |
| 2,021,275 A | 11/1935 | Warner |
| 2,305,065 A | 12/1942 | Corkish |
| 2,347,273 A | 4/1944 | Lyle |
| 2,473,189 A | 6/1949 | Baker |
| 2,624,120 A | 1/1953 | Mills |
| 2,649,787 A | 8/1953 | Kobayashi |
| 2,763,929 A | 9/1956 | Metcalf |
| 3,063,157 A | 11/1962 | Frank |
| 3,100,941 A | 8/1963 | Taylor |
| 3,120,059 A | 2/1964 | Michel |
| 3,191,308 A | 6/1965 | Lindenau |
| 3,220,112 A | 11/1965 | Michel |
| 3,255,531 A | 6/1966 | Anderson |
| 3,375,590 A | 4/1968 | Andre |
| 3,426,435 A | 2/1969 | Ballard |
| 3,526,964 A | 9/1970 | Clark |
| 3,534,478 A | 10/1970 | Fisher |
| 3,731,389 A | 5/1973 | King |
| 3,832,783 A | 9/1974 | Schreier |

(Continued)

FOREIGN PATENT DOCUMENTS

| | | |
|---|---|---|
| CN | 203310316 U | 11/2013 |
| CN | 203310317 U | 11/2013 |

(Continued)

*Primary Examiner* — Yaritza Guadalupe-McCall
(74) *Attorney, Agent, or Firm* — Colby Nipper PLLC

(57) ABSTRACT

A tape measure having a housing, a marking device for applying a mark to a surface to be marked, and a carriage member connected to a constant force spring for advancing a marking substance against a marking wheel configured for applying a mark to a surface to be measured and marked.

30 Claims, 12 Drawing Sheets

(56) References Cited

U.S. PATENT DOCUMENTS

| | | | |
|---|---|---|---|
| 4,015,337 | A | 4/1977 | Taylor |
| 4,439,927 | A | 4/1984 | Elliott |
| 4,542,589 | A | 9/1985 | Yamamoto |
| 4,551,847 | A | 11/1985 | Caldwell |
| 4,574,486 | A | 3/1986 | Drechsler |
| 4,578,867 | A | 4/1986 | Czerwinski et al. |
| 4,580,347 | A | 4/1986 | McKnight |
| 4,599,942 | A | 7/1986 | Bo |
| 4,630,376 | A | 12/1986 | Pentecost |
| 4,649,649 | A | 3/1987 | Fain |
| 4,667,412 | A | 5/1987 | Carlson |
| 4,729,171 | A | 3/1988 | Samson |
| 4,756,087 | A | 7/1988 | Sing |
| 4,760,648 | A | 8/1988 | Doak et al. |
| 4,965,941 | A | 10/1990 | Agostinacci |
| 4,976,037 | A | 12/1990 | Hines |
| 4,989,326 | A | 2/1991 | OMalley |
| 4,991,472 | A | 2/1991 | Hollingsworth |
| 5,038,492 | A * | 8/1991 | Bryant ............... E04G 21/1891 156/523 |
| 5,060,394 | A | 10/1991 | Lincoln et al. |
| 5,379,524 | A | 1/1995 | Dawson |
| 5,416,978 | A | 5/1995 | Kaufman |
| 5,430,952 | A | 7/1995 | Betts |
| 5,435,074 | A | 7/1995 | Holevas et al. |
| 5,477,619 | A | 12/1995 | Keams |
| 5,505,133 | A | 4/1996 | Chen |
| 5,577,329 | A | 11/1996 | States |
| 5,671,543 | A | 9/1997 | Sears |
| 5,735,052 | A | 4/1998 | Lin |
| 5,809,662 | A | 9/1998 | Skinner |
| 5,815,939 | A | 10/1998 | Ruffer |
| 5,829,152 | A | 11/1998 | Potter et al. |
| 5,832,622 | A | 11/1998 | Mann |
| 6,041,513 | A | 3/2000 | Doak |
| 6,108,926 | A | 8/2000 | Fraser et al. |
| 6,178,655 | B1 | 1/2001 | Potter et al. |
| 6,212,787 | B1 | 4/2001 | Dixon |
| 6,264,272 | B1 | 7/2001 | Jones et al. |
| 6,363,622 | B1 | 4/2002 | Stratton |
| 6,497,050 | B1 | 12/2002 | Ricalde |
| 6,513,261 | B2 | 2/2003 | Johnson |
| 6,547,098 | B1 | 4/2003 | Kaye |
| 6,607,110 | B2 | 8/2003 | Nusbaum |
| 6,637,125 | B2 * | 10/2003 | Scarborough ........ G01B 3/1041 33/42 |
| 6,698,104 | B2 * | 3/2004 | Scarborough ........ G01B 3/1084 33/42 |
| 6,701,635 | B2 * | 3/2004 | Scarborough ........ G01B 3/1041 33/42 |
| 6,701,636 | B2 * | 3/2004 | Scarborough ........ G01B 3/1041 33/42 |
| 6,789,329 | B1 | 9/2004 | Hester |
| 6,826,845 | B2 | 12/2004 | Pritchard |
| 6,880,260 | B2 | 4/2005 | Baida |
| 6,892,469 | B2 | 5/2005 | Tufts et al. |
| 6,910,280 | B2 | 6/2005 | Scarborough |
| 6,941,672 | B2 * | 9/2005 | Scarborough ........ G01B 3/1041 33/42 |
| 6,944,962 | B2 | 9/2005 | Tessel et al. |
| 6,971,185 | B2 | 12/2005 | Scarborough |
| 7,040,035 | B1 * | 5/2006 | Scarborough ........ G01B 3/1084 33/668 |
| 7,334,344 | B2 | 2/2008 | Scarborough |
| 2001/0005940 | A1 | 7/2001 | Schwarz |
| 2001/0029673 | A1 | 10/2001 | Brown et al. |
| 2002/0073568 | A1 | 6/2002 | Johnson |
| 2002/0129511 | A1 | 9/2002 | Laughlin et al. |
| 2004/0143984 | A1 * | 7/2004 | Scarborough ........ G01B 3/1041 33/668 |
| 2004/0168335 | A1 | 9/2004 | Pritchard |
| 2005/0178019 | A1 * | 8/2005 | Scarborough ........ G01B 3/1041 33/668 |
| 2005/0183280 | A1 * | 8/2005 | Scarborough ........ G01B 3/1084 33/765 |
| 2005/0198850 | A1 * | 9/2005 | Scarborough ........ G01B 3/1041 33/761 |
| 2006/0185185 | A1 * | 8/2006 | Scarborough ........ G01B 3/1084 33/759 |
| 2017/0176160 | A1 * | 6/2017 | Scarborough ........ G01B 3/1084 |

FOREIGN PATENT DOCUMENTS

| | | |
|---|---|---|
| CN | 203310318 U | 11/2013 |
| CN | 203310319 U | 11/2013 |
| CN | 203310320 U | 11/2013 |
| CN | 203323630 U | 12/2013 |
| CN | 203323631 U | 12/2013 |
| CN | 203375889 U | 1/2014 |
| CN | 203422031 U | 2/2014 |
| CN | 203579780 U | 5/2014 |
| CN | 203586971 U | 5/2014 |
| CN | 103952521 A | 7/2014 |
| CN | 103954184 A | 7/2014 |
| CN | 203744863 U | 7/2014 |
| RU | 61861 U1 | 3/2007 |
| WO | 0208687 A1 | 1/2002 |

\* cited by examiner

MARKING TAPE MEASURE

TECHNICAL FIELD

This disclosure and the drawings submitted herewith relate generally to measuring devices, and more specifically relate to a tape measure that incorporates a marking device configured for allowing an individual to measure and mark a wide variety of materials in a more efficient and accurate manner.

BACKGROUND

Various different forms and types of measuring devices are known to the prior art. One particular type of measuring device is known as a "tape measure." Tape measures typically comprise a flexible tape resiliently coiled within a housing. The flexible tape is normally printed with incremental measuring marks for measuring distances. In use, the flexible tape is uncoiled and extended from the housing and placed on a surface to be measured. Distances can then be marked with a separate marking means, such as a pen or pencil, directly onto the surface measured.

The use of "tape measure" herein means, a measuring device, including but not limited to digital measuring devices, laser rangefinders, laser measuring tools, proximity sensors, optical sensors, tape measures, GPS, magnetic, and sonar, unless the context clearly dictates otherwise. Thus, non-tape measure measuring devices are envisioned within this disclosure of exemplary "tape measures." Likewise reference to a "marking tape measure," "marking measuring device," and the like, is not intended to serve as a requirement that an exemplary measuring device have a marking device and/or marking capabilities.

Numerous devices incorporating marking devices inside and outside tape measure housings are known in the prior art. These include marking devices which are affixed to existing tape measure housings, for instance the self adhesive scoring attachment of U.S. Pat. No. 6,041,513 (Doak), and other marking devices (for instance U.S. Pat. No. 6,698,104 (Scarborough), U.S. Pat. No. 6,701,635 (Scarborough), U.S. Pat. No. 6,637,125 (Scarborough), U.S. Pat. No. 6,701,636 (Scarborough), U.S. Pat. No. 6,910,280 (Scarborough), U.S. Pat. No. 6,941,672 (Scarborough), U.S. Pat. No. 6,971,185 (Scarborough), and U.S. Pat. No. 7,334,344 (Scarborough)). Marking devices can also include marking tools which are affixed to belt clips of existing tape measure housings. In example, U.S. Pat. No. 4,760,648 (Doak et al.) which discloses a marking device adapted to be mounted on one side of the tape measure, namely as a replacement belt clip. Marking devices can also include housings configured for receipt therethrough of marking means, such as pencils or pens. In example, U.S. Pat. No. 5,735,052 (Lin) discloses a tape measure having formed therein a passage for receiving therethrough the marking means. Marking devices can also include marking tools which are integral with the tape measure housing. For instance, U.S. Pat. No. 5,435,074 (Holevas et al.) discloses a tape measure having a marker attached to the tape measures lock so that depression of the lock mechanism also extends the marker out of the housing of the tape measure. Also, U.S. Pat. No. 4,015,337 (Taylor) discloses a marking device integrally formed into the housing of the tape measure. Marking devices can also include scoring means rather than marking means utilizing indicia (e.g., ink, graphite). For instance, U.S. Pat. No. 2,649,787 (Kobayashi), U.S. Pat. No. 3,063,157 (Keene), and U.S. Pat. No. 352,664 (Clark, Jr.).

BRIEF DESCRIPTION OF THE DRAWINGS

Various other objects, features and advantages of the present invention will become fully appreciated as the same becomes better understood when considered in conjunction with the accompanying drawings, in which like reference characters designate the same or similar parts throughout the several views.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "spring" includes two or more such springs, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "solid marking substance" means a pigment core configured to, by physical abrasion, create a mark comprising a trail of pigment core material on a surface marked, unless the context clearly dictates otherwise. Examples of solid marking substances include, but are not limited to solid pigment cores, semi-solid pigment cores, pencil leads (e.g., graphite or another pigment mixed with a clay binder), colored pencils, grease pencils, carbon pencils, graphite, charcoal, wax, chalk, ink, and paint. Exemplary solid marking substances are provided in units. Such units including but not limited to rods, blocks, chunks, and spheres of solid marking substance.

Figure 1:
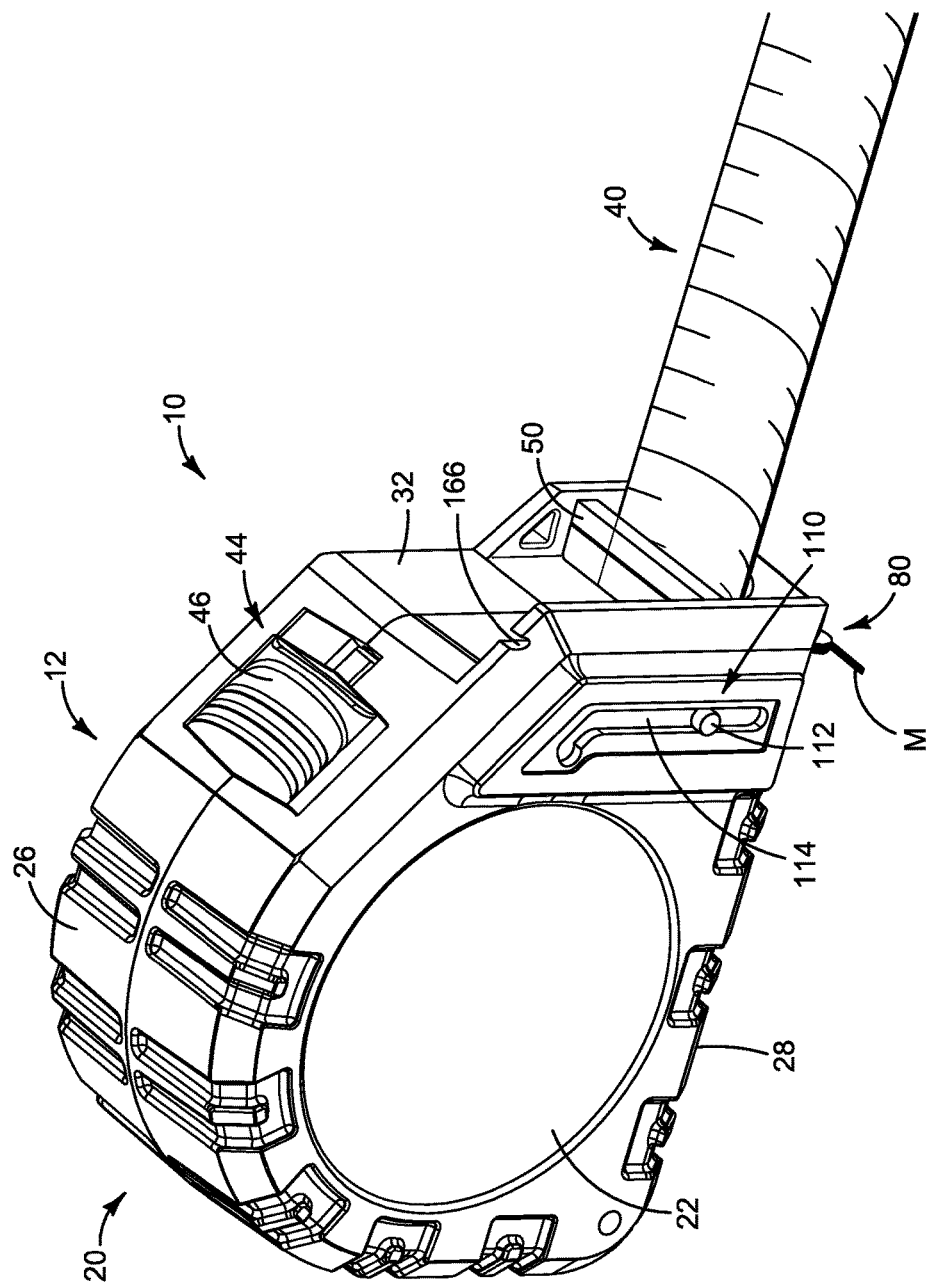
FIG. 1 is a perspective view of one embodiment of the present invention.
Figure 2:
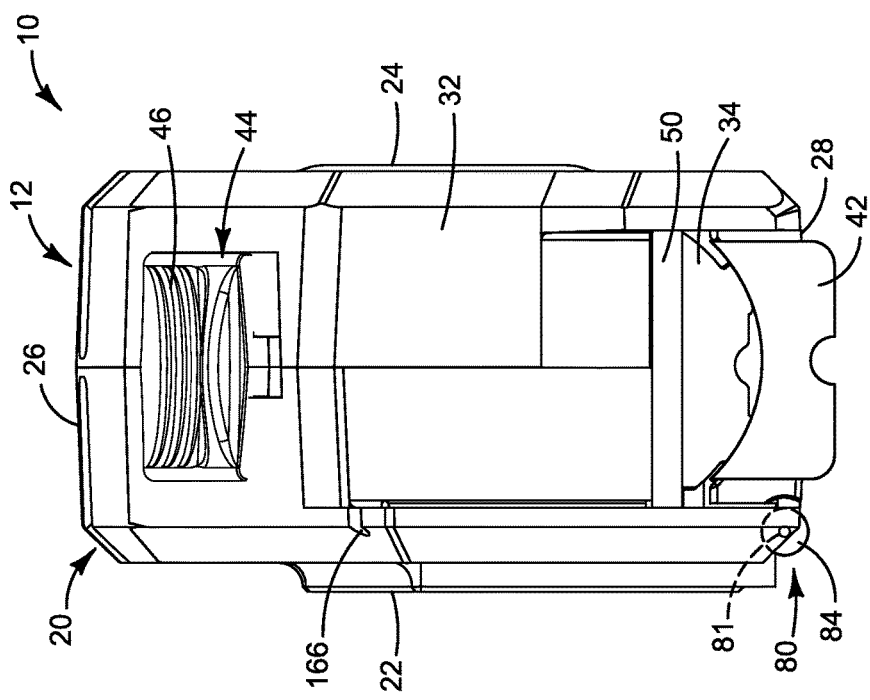
FIG. 2 is a front view of the embodiment illustrated in FIG. 1.
Figure 3:
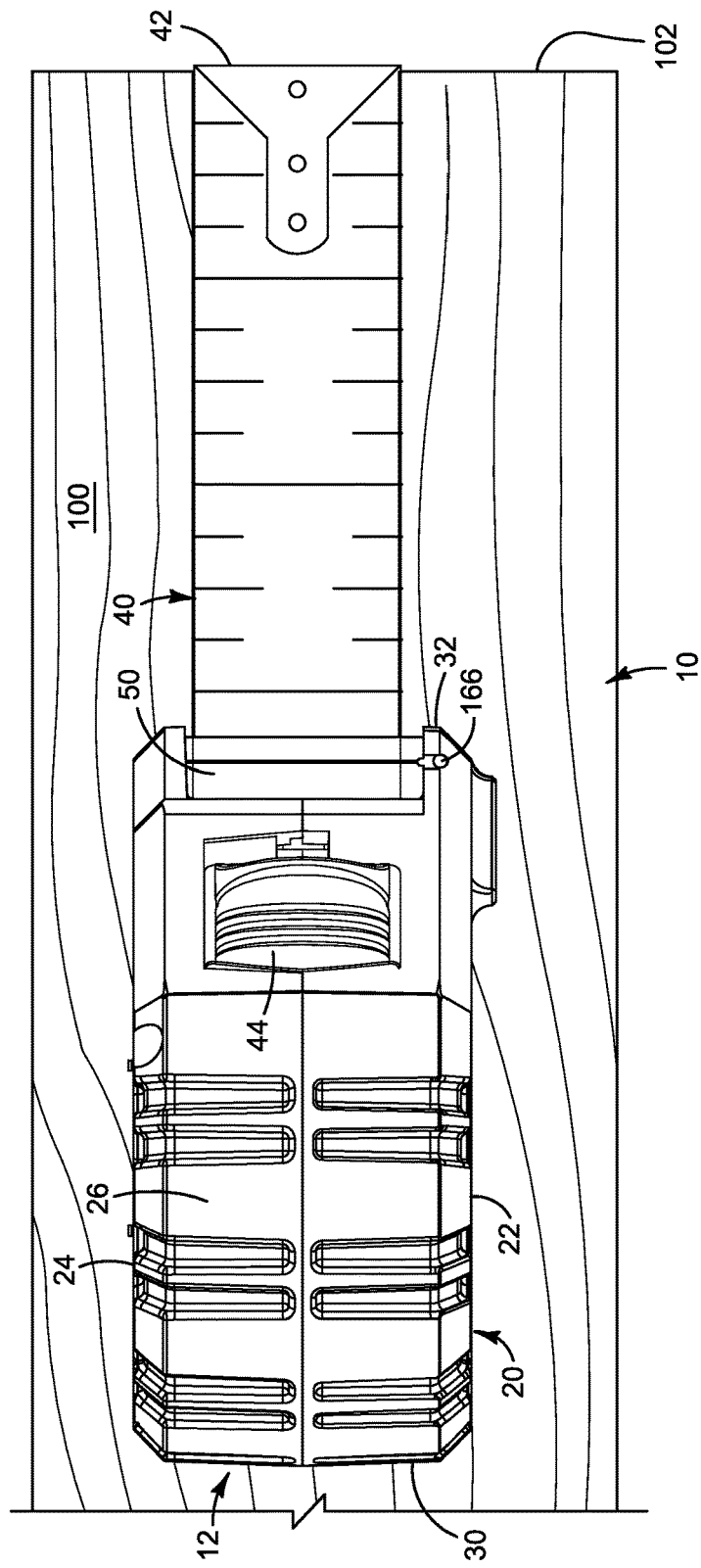
FIG. 3 is a top view of the embodiment illustrated in FIG. 1.

Described herein, and illustrated in the drawings, are exemplary tape measures. Referring initially to FIGS. 1 through 3, illustrated is a first exemplary tape measure 10. The first exemplary tape measure 10 comprises a measuring device 12 incorporating a marking device 80. The first exemplary tape measure 10 includes a housing 20, a coiled measuring tape 40 having measuring indicia thereon, a tape tip 42, a marking device 80, an indicator viewer 50, and a lock portion 44.

The housing 20 is preferably an elongated square, a cylindrical shape or a combination thereof, as illustrated in the Figures. Many different shapes and styles of tape measure housings are known to the prior art and may be configured for use with an exemplary tape measure. The housing 20 illustrated in FIGS. 1 through 6 having a first side wall 22 opposing a second side wall 24, a top wall 26, a base 28, a rear wall 30, and a front wall 32. These walls defining an enclosure for holding a coiled measuring tape 40. The front wall 32 having a tape blade aperture 34 defined therethrough for allowing the coiled measuring tape 40 to be extended. It is preferred that the housing 20 be made of a rigid material such as metal, plastic, rubber, composite or a combination thereof.

As used herein, the terms "downwards" and "first direction" refer to movement in the direction towards the base 28 of the tape measure 10, and the terms "upwards" and "second direction" refer to movement in the direction away from the base 28 of the tape measure 10.

In the first exemplary tape measure 10, the coiled measuring tape 40 is an elongated blade formed of a ribbon of material coiled on a spooling means (such as a spool), with a retraction means (such as a spring mechanism). Such coiled measuring tapes with spring retraction means are common in the prior art. It is preferred that the coiled measuring tape 40 be made of a resilient material, such as metal, plastic or a composite. The uncoiled end of the coiled measuring tape 40 terminates in a tape tip 42 configured for hooking onto the edge 102 of the surface 100 to be measured/marked, such as the edge of a board.

The first exemplary tape measure 10 is configured to be used upon a surface 100 to be measured and marked. The surface 100 to be measured and marked can be of any shape or size material that would commonly be measured with a tape measure. The surface 100 to be measured and marked may also be a structure or a combination of materials. In use, particularly as illustrated in FIG. 3, the tape tip 42 is hooked on the edge 102 of the surface 100 to be measured/marked. The housing 20 then moved away from the edge 102 thereby extending the coiled measuring tape 40. Side-to-side movement of the housing 20 at the desired mark location results in the marking device 80 making a mark M on the surface 100 to be measured/marked generally perpendicular to the axis of the length of the coiled measuring tape 40 (the direction the coiled measuring tape 40 can be extended out of the housing 20).

As illustrated in FIGS. 1, 2 and 3, in the first exemplary tape measure 10, the housing 20 comprises an indicator viewer 50 that is in alignment with the marking device 80. Thus, the indicator viewer 50 gives the user of the first exemplary tape measure 10 a precise indication of where the marking device 80, such as marking wheel 84, is aligned, thereby indicating the alignment of the mark to be made by the marking device 80. Preferably, the upper opening 66 (discussed below) is aligned with the radial axis of the marking wheel 84 (described below) so that a user can use the location of the upper opening 66 as a visual clue regarding the location of the marking wheel 84. Further, the housing 20 can comprise an indicator protrusion 166 adjacent the upper opening 66 which can work independently of the indicator viewer 50, or as a supplement thereto for assisting a user in determining the alignment of the marking device 80 relative to the surface 100 to be marked.

As illustrated in FIG. 3, in use, the housing 20 may be brought into contact with the surface 100 to be measured and marked. The tape tip 42 is allowed to engage the edge 102 of the surface 100 to be measured and marked, while the housing 20 is pulled across the surface 100 to be measured and marked to the desired location as verified by the indicator viewer 50. Preferably, the marking wheel 84 is oriented generally perpendicular to the axis of the length of the coiled measuring tape 40.

As illustrated in FIGS. 1 through 13, the housing 20 is configured for holding at least one unit of a solid marking substance 60. For instance, referring to the illustrations, the housing 20 can comprise a marking substance holder 61 for holding said unit(s) of solid marking substance 60. In the housing 20 illustrated in the Figures, the marking substance holder 61 comprises an elongated vertical sleeve having top end 65 and a bottom end 63. The top end 65 open at an upper opening 66 for receiving additional units of marking substance therethrough, inserted into the marking substance holder 61. The bottom end 63 is open at a bottom opening 67 adjacent the marking wheel 84. Defined in the side wall of the marking substance holder 61 is the track 73 which is described in detail below. The marking substance holder 61 can be defined within components of the housing 20 which are formed when the housing 20 is assembled from multiple components, as is illustrated in FIGS. 4, 5, 7, 8, 11, 12 and 13. Alternatively, the sleeve can comprise a separate structure which is added to the housing 20.

Exemplary marking devices 80 may be configured for abrading the sold marking substance 60 and transferring abraded marking substance onto a surface to be marked. For instance, as illustrated in the Figures, particularly FIG. 2, the marking device 80 comprises a marking wheel 84. The marking wheel 84 may be hardened and/or ground at an angle, similar to a glass-cutting wheel. Such an angle may be configured to provide a narrow, accurate mark. Exemplary marking wheels may further comprise a rim for contacting the surface to be marked, at least a portion of this rim extending out of the enclosure. The marking wheel could likewise be made of different materials for the different purposes discussed within this application, including, but not limited to metal, composites, rubber, plastic, natural materials, foam, etc. Likewise, the shape of the marking wheel can be as necessary, including but not limited to: rounded, flat, angled, sharpened, solid, porous, etc.

While the marking device 80 illustrated in FIGS. 1 through 13 is one particular configuration of a marking device, a skilled artisan will be able to select an appropriate marking device in a particular embodiment based on various considerations, including the intended use of the tape measure, the intended arena within which the tape measure will be used, and the equipment and/or accessories with which the tape measure is intended to be used, among other considerations, including the marking devices disclosed in the inventor's related U.S. Patents, namely U.S. Pat. Nos. 6,698,104, 6,701,635, 6,637,125, 6,701,636, 6,910,280, 6,941,672, 6,971,185, and 7,334,344.

The marking wheel 84 is configured for contacting the first end 62 of an elongated rod of a solid marking substance 60. The marking substance first end 62 abrades against the marking wheel 84, resulting in pigment core material being transferred to the marking surface 86 of the marking wheel 84. As the first end 62 abrades, the first end 62 moves along the length of the solid marking substance 60, nearer to the second end 64 of the solid marking substance 60. As the marking wheel 84 rotates, the marking surface 86 contacts the surface 100 to be marked, and pigment core material present on the marking surface 86 is transferred to the surface 100 resulting in a mark M on the surface 100, as illustrated in FIG. 1.

Figure 9:
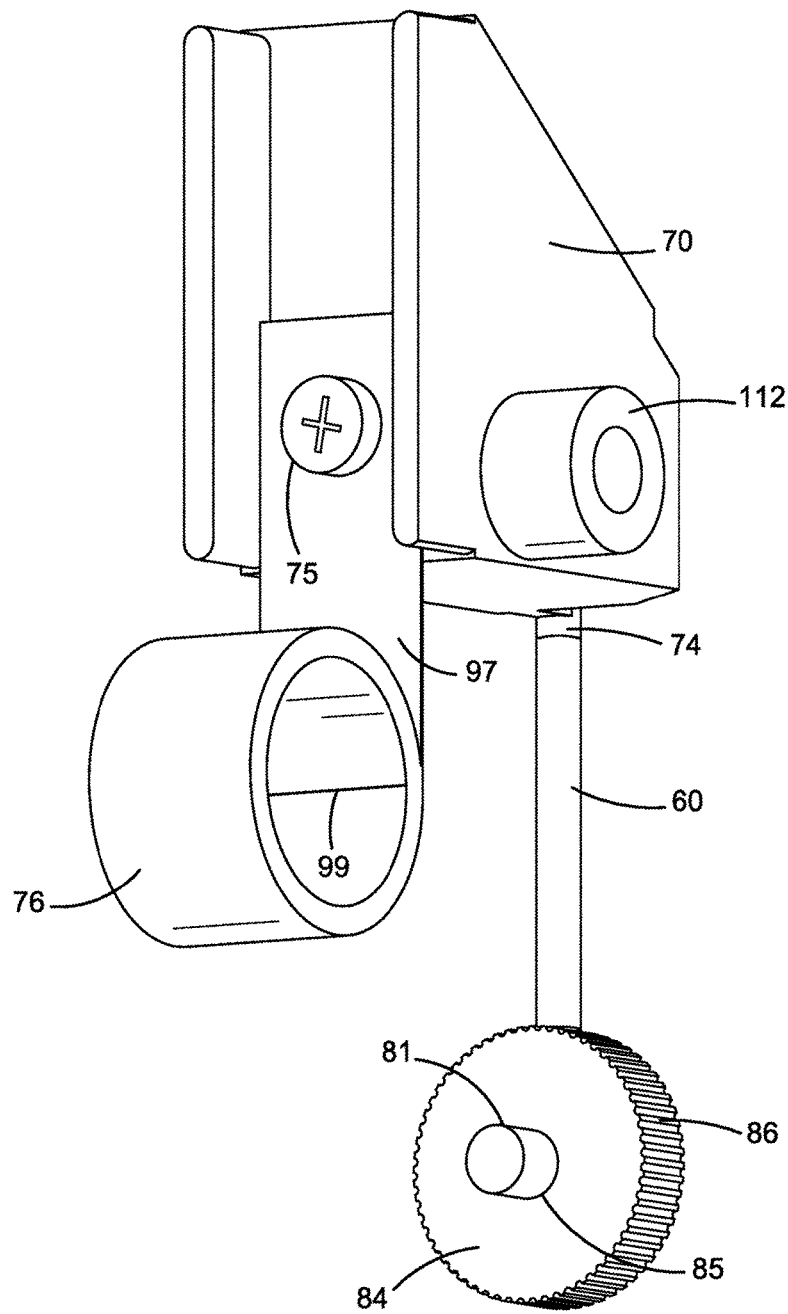
FIG. 9 is a first partial, perspective view of the embodiment illustrated in FIG. 1.
Figure 10:
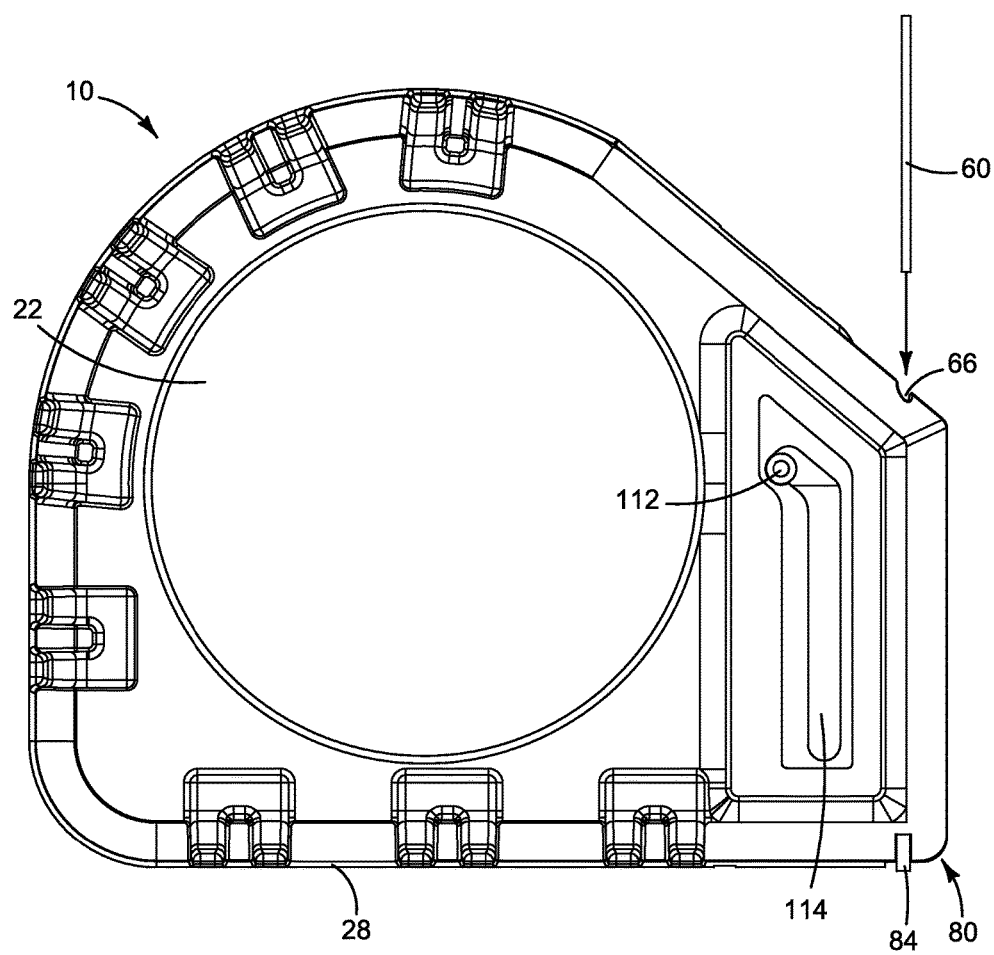
FIG. 10 is a fifth partial, exploded, side perspective view of the first side of the housing of the embodiment illustrated in FIG. 1.

The marking surface 86 of the marking wheel 84 is preferably abrasive, for instance through having a knurled or otherwise rough surface applied to it, as illustrated in FIG. 9. By being abrasive, the marking surface 86 is better able to abrade the marking substance first end 62 to result in core material being transferred to the marking surface 86 from the marking substance 60.

It is preferred that the marking substance 60 be held under tension or compression against the marking surface 86 of the marking wheel 84 so as to assist in the abrasion of pigment core material from marking substance 60 onto the marking surface 86. Thus, rotation of the marking wheel 84 against the surface 100 to be measured and marked also results in rotation of the marking surface 86 against the marking substance 60. This results in the transmission of pigment core material from the marking substance 60 onto the marking surface 86 of the marking wheel 84. Then, continued movement of the marking wheel 84 against the surface 10 to be measured and marked results in the transfer of pigment core material to the surface 100 to be measured and marked thereby creating a mark.

In a second exemplary marking tape measure, the marking device does not comprise a marking wheel, but instead, the first end of the marking substance would be held under tension or compression against the surface to be measured and marked. Movement of the measuring device relative to the surface would result in the marking substance abrading against the surface and creating a mark on the surface.

Figure 8:
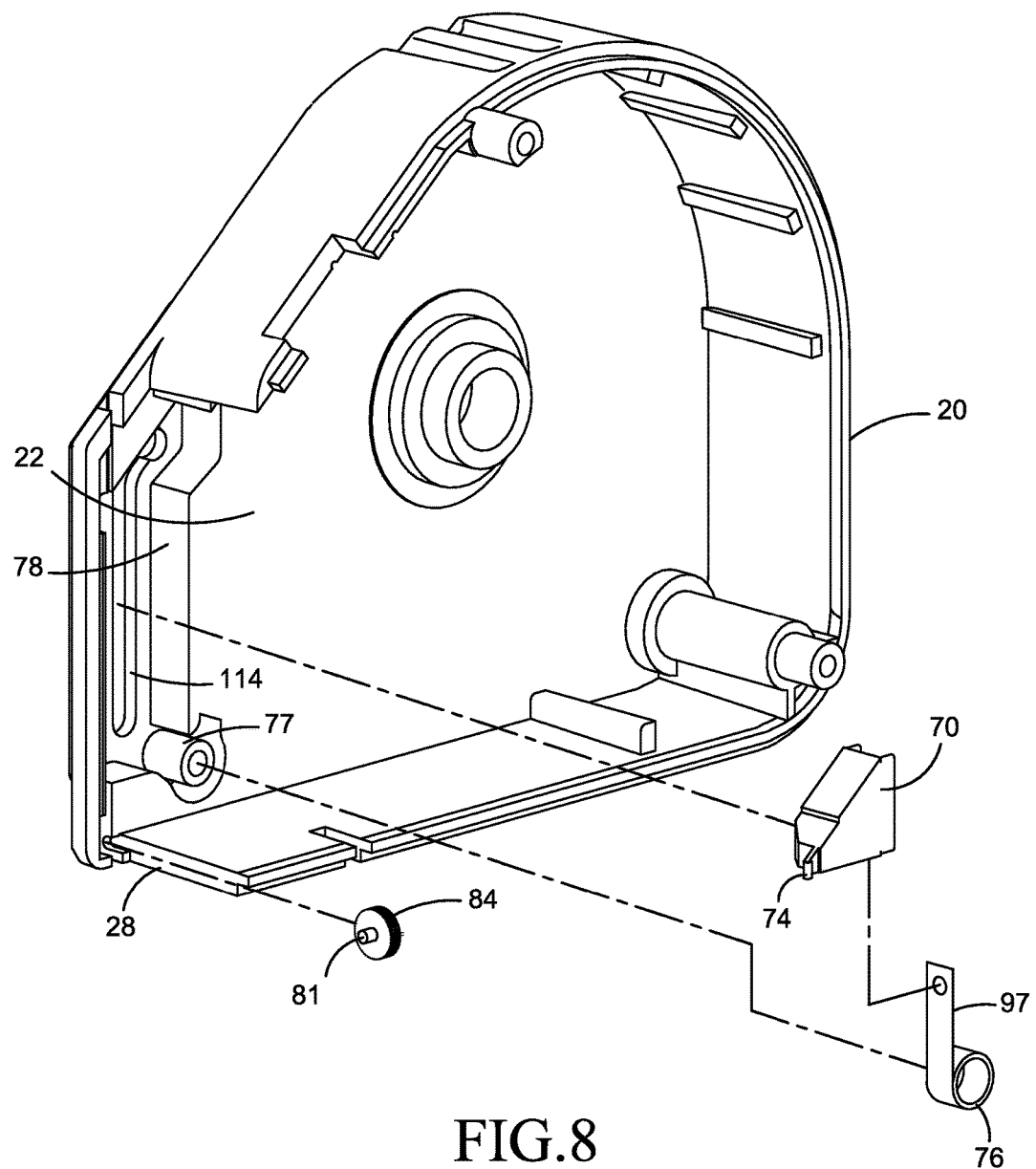
FIG. 8 is a fourth partial, exploded, side perspective view of the first side of the housing of the embodiment illustrated in FIG. 1.

Referring back to the first exemplary marking tape measure 10 illustrated in the Figures, specifically FIGS. 8 and 9, the marking wheel 84 has an aperture 85 which is configured for receiving an axle 81 therein. The marking wheel 84 is configured for rotation on the axle 81. Alternatively, the axle may comprise axle protrusions or ends which are configured for rotational engagement with a portion of the marking tape measure's enclosure.

While a wheeled marking device 80 is illustrated herein, a skilled artisan will be able to select an appropriate form of marking device for use in a particular embodiment based on various considerations, including the intended use of the tape measure, the intended arena within which the tape measure will be used, and the equipment and/or accessories with which the tape measure is intended to be used, among other considerations.

The marking device 80 comprises a carriage member 70. The carriage member 70 configured for longitudinal movement along a path in a first direction and in a second direction. Any suitable structure can be utilized as the path, including but not limited to a slide passageway defined in the housing in which the carriage member travels, a rail or track on which the carriage member can travel, a surface which the carriage member tracks, a track in which an extension from the carriage member can travel, and the like.

In the first exemplary tape measure 10 illustrated in the Figures, the path is generally parallel to a radial plane of the marking wheel 84, so that the carriage member 70 can, through force applied by the constant force spring 76, apply pressure to a stick of marking substance 60 held against the marking wheel 84.

Figure 4:
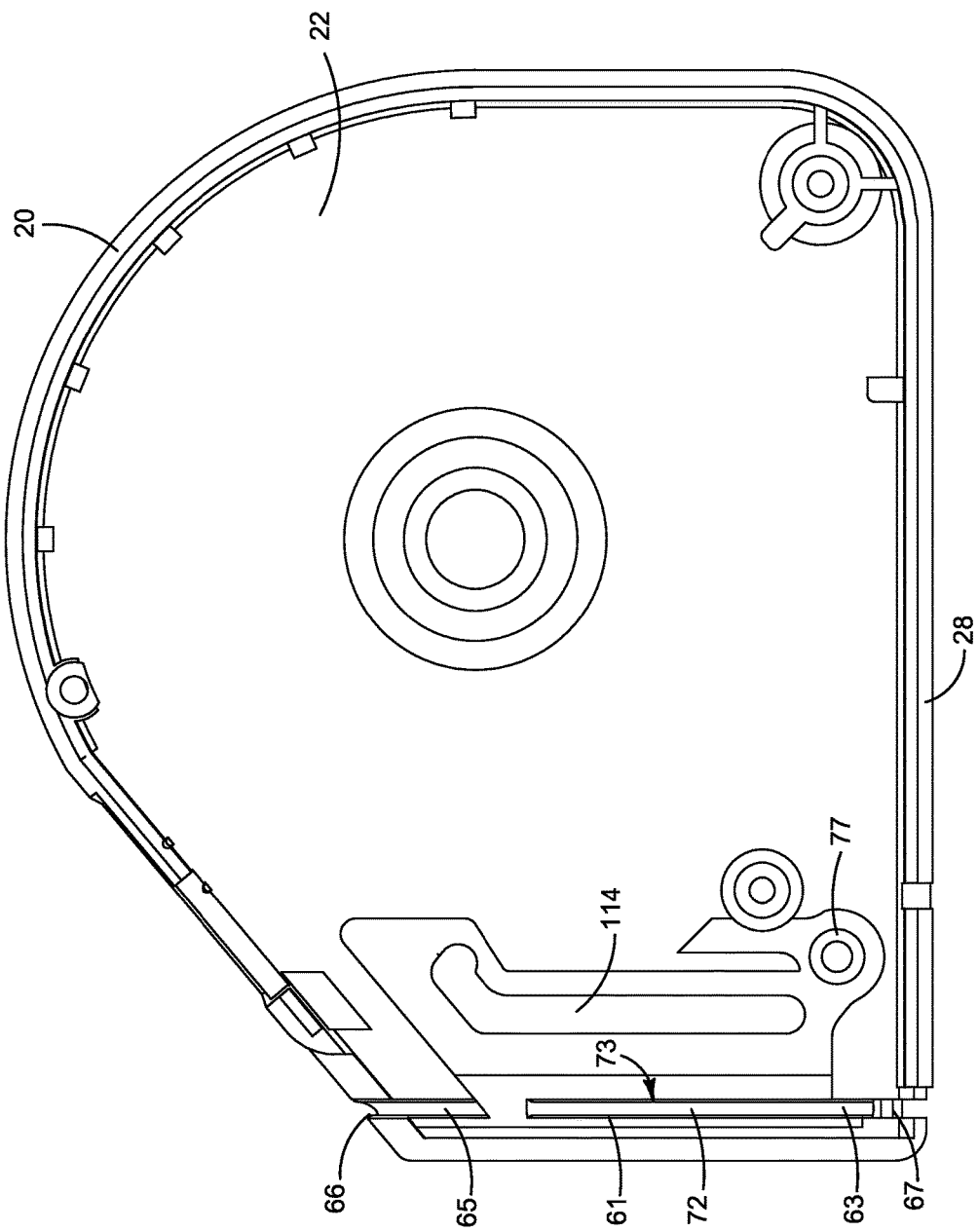
FIG. 4 is a side elevational view of the first side of the housing of the embodiment illustrated in FIG. 1.
Figure 5:
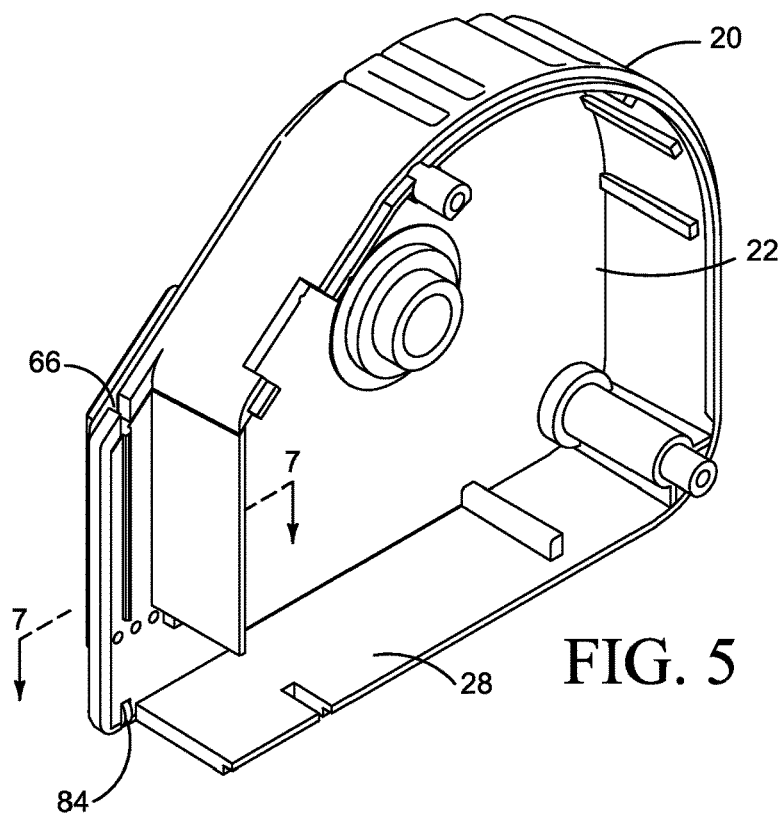
FIG. 5 is a second partial, side perspective view of the second side of the housing of the embodiment illustrated in FIG. 1.
Figure 6:
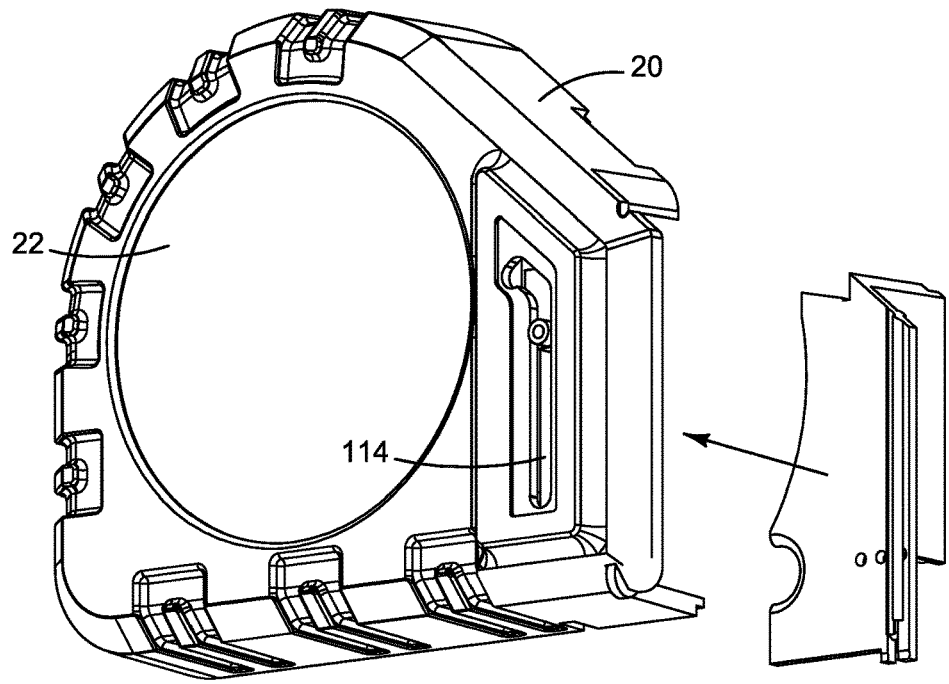
FIG. 6 is a third partial, exploded, side perspective view of the first side of the housing of the embodiment illustrated in FIG. 1.
Figure 7:
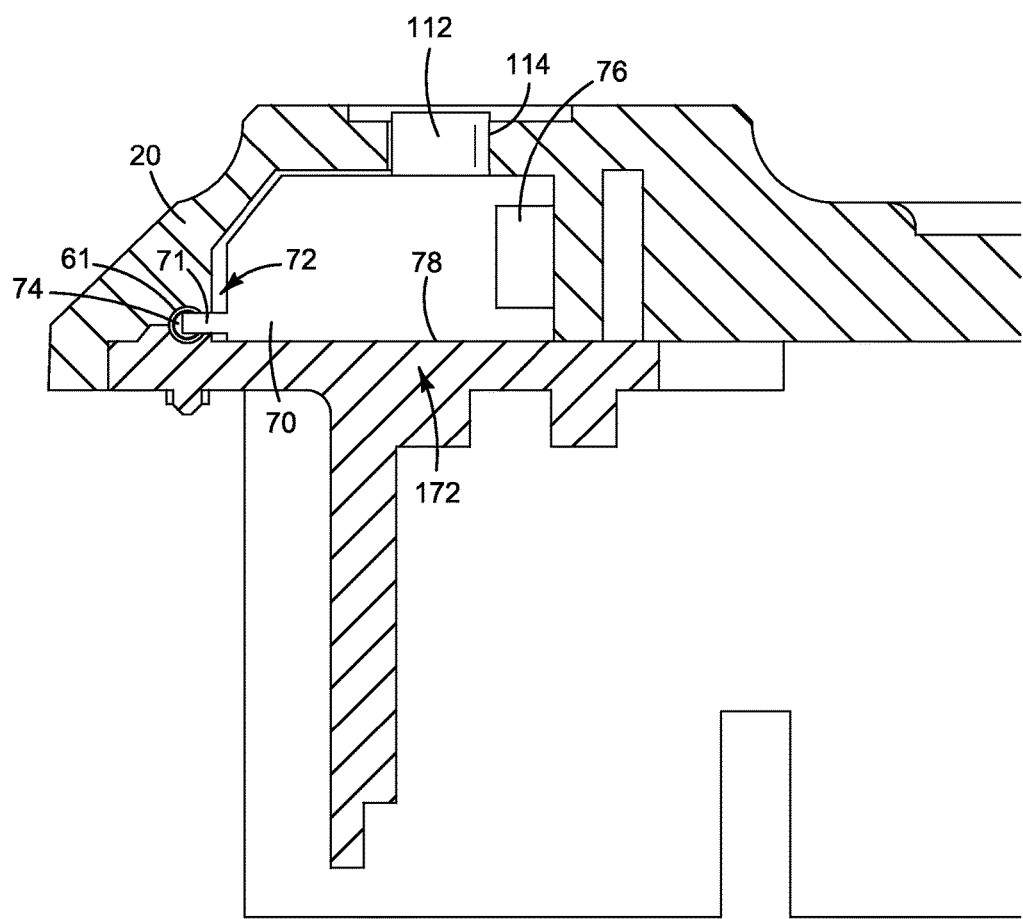
FIG. 7 is a cross-sectional view of the first side of FIG. 1.

In the first exemplary tape measure 10 illustrated in the Figures, the path can comprise one or more of path 72, path 172, and/or path 114. As illustrated in FIGS. 4, 7 and 8, path 72 comprises a track 73 defined in the marking substance holder 61, and the carriage member 70 comprises an extension 71 which extends into, and follows, the path 72. The carriage member 70, as it longitudinally moves along the path in the first direction and the second direction, draws the extension 71 which rides in the track 73 in the first direction and the second direction. The track 73 can serve to keep the carriage member 70 aligned along the path.

Alternatively, or in addition thereto, the path illustrated in these figures comprises a path 172 configured as a passageway 78 defined in the housing 20 in which the carriage member 70 can be moved longitudinally in a first direction and a second direction, for instance FIG. 7. The passageway 78 having a plurality of sides which the carriage member 70, itself having a plurality of sides, is sized to move longitudinally through, the side walls of the passageway guiding the carriage member 70 along the path 172. Path 114 is described in detail below. While the figures illustrate three paths, exemplary tape measures may have none, one, two or all three of them.

In the first exemplary tape measure 10 illustrated in the Figures, particularly FIG. 7, the carriage member 70 is configured for following a path 172, and the carriage member 70 has an extension 71 which is configured for insertion into a track 73 which is aligned with path 72. Path 72 and path 172 are generally parallel to one another.

The extension 71 preferably further comprises a ram 74 configured for contacting and driving the second end 64 of the marking substance 60. In the first exemplary tape measure 10 illustrated in the Figures, the extension 71 terminates in the ram 74. In other exemplary tape measures, a portion of the extension could comprise the ram. As illustrated in FIG. 7, the ram 74 can be located within the marking substance holder 61, and configured for movement in first and second directions within the marking substance holder 61. The ram 74 comprising a surface configured for contacting the second end 64 of the marking substance 60, thereby enabling the ram 74, when a force is exerted on the carriage member 70 in a first (downwards) direction, to apply pressure to the marking substance 60 (via the second end 64), holding it against the marking wheel 84.

The marking device 80 further comprises a constant force spring 76. The constant force spring 76 comprises a coiled, elongated ribbon of metal or composite material having a coiled end portion and a free end portion 97. The carriage member 70 comprises a spring connector 75 for connecting with the constant force spring 76 at the free end portion 97. For instance, the spring connector 75 could comprises a mechanical fastener (such as a screw) configured for engagement with a hole (not illustrated) defined in the body of the carriage member 70. The fastener connected after insertion through an orifice defined through the free end portion 97, thereby attaching the free end portion 97 of the constant force spring 76 to the carriage member 70. A skilled artisan will be able to select an appropriate type of connection for the spring connector 75 in a particular embodiment based on various considerations, including the intended use of the tape measure 10, among other considerations.

The constant force spring 76 having a second end 99. The second end 99 portion configured for mounting to the housing 20 of the tape measure 10. The mounting of the second end 99 can be a fixed or a free connection. For instance, the second end 99 could form a coiled spring portion which connects to the housing at an axle 77. The constant force spring 76 configured for being extended away from said axle 77, and applying a force in the general direction of the axle 77.

When the carriage member 70 is so attached to the constant force spring 76, the constant force spring 76 draws the carriage member 70 in a first direction under tension. The path 72 is generally oriented, with respect to the location of the axle 77 of the constant force spring 76, that the constant force spring 76, when under tension, can exert a downwards pressure in the first direction on the carriage member 70 which is translated to the ram 74 of the carriage member 70, allowing the ram 74 to hold the marking substance 60 under tension against the marking wheel 84 of the marking device 80.

Figure 11:
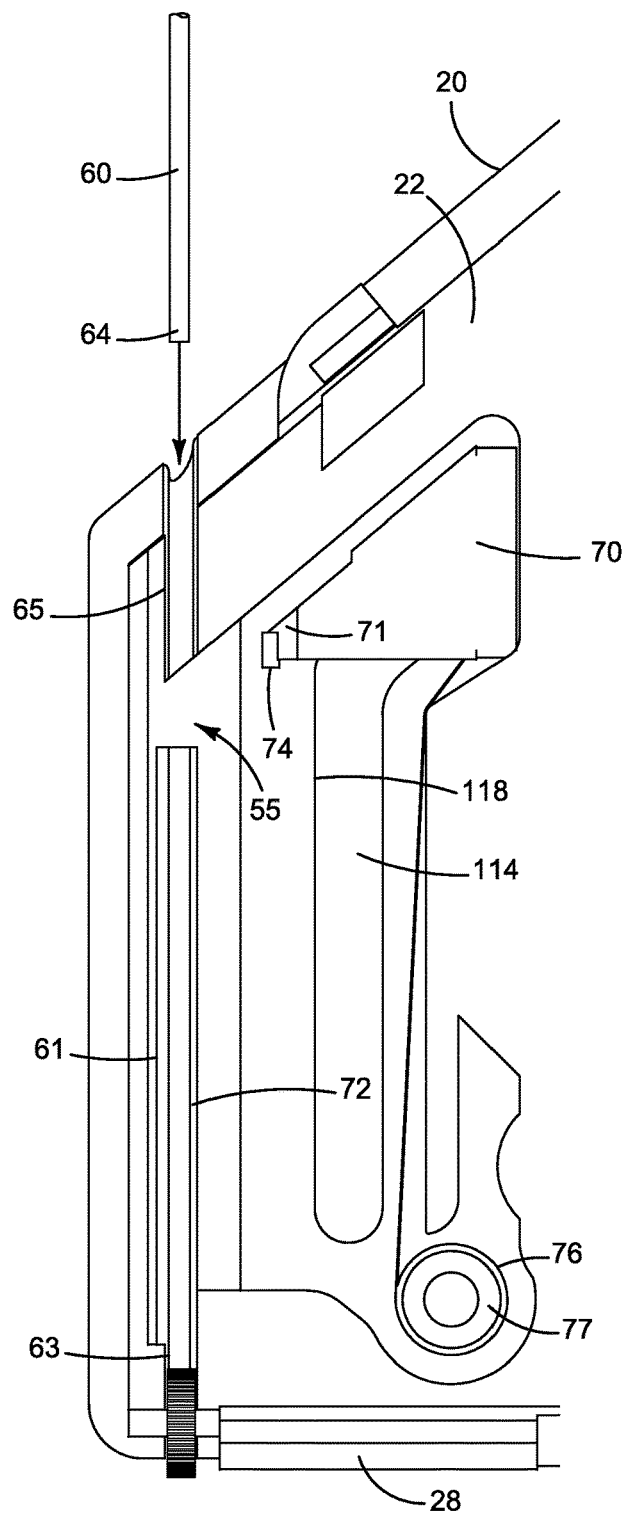
FIG. 11 is a second partial, perspective view of the embodiment illustrated in FIG. 1.
Figure 12:
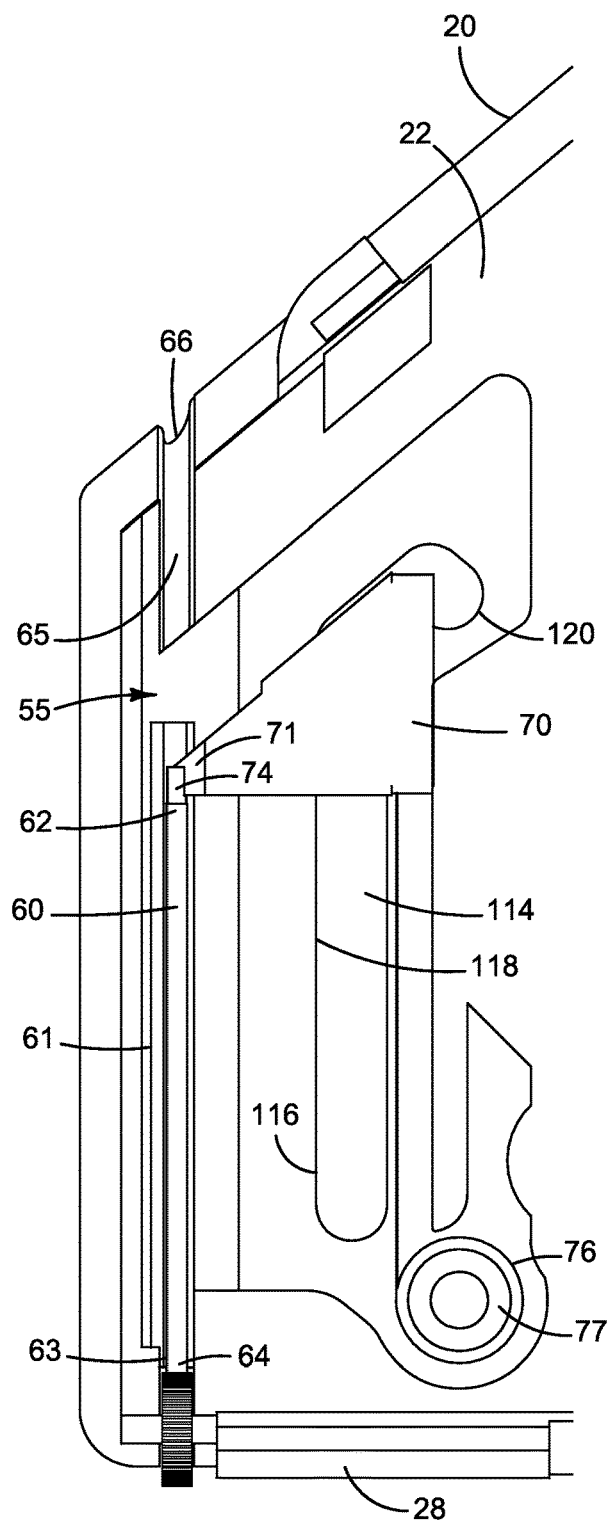
FIG. 12 is a third partial, perspective view of the embodiment illustrated in FIG. 1.
Figure 13:
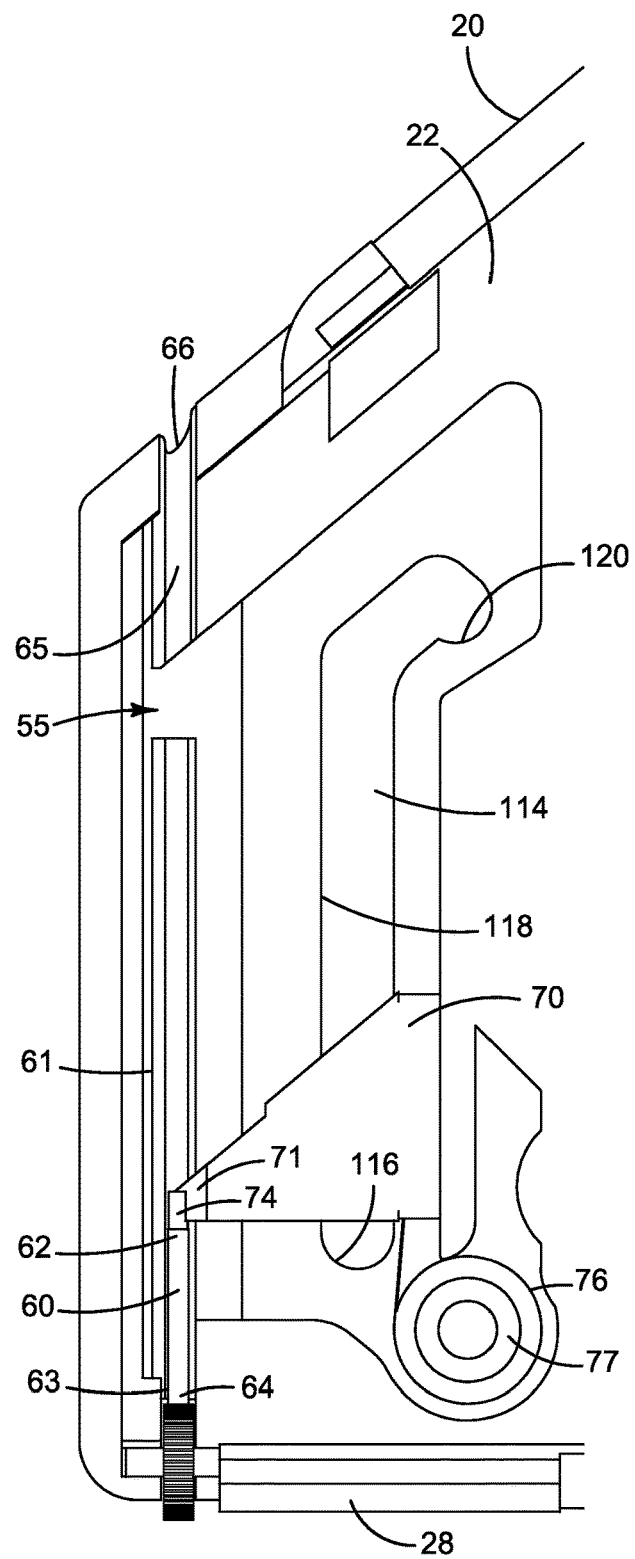
FIG. 13 is a fourth partial, perspective view of the embodiment illustrated in FIG. 1.

The constant force spring 76 is configured to advance the carriage member 70 along a longitudinal axis distally from an upper position distal from the base 28 to lower position proximal to the base 28. FIG. 11 illustrates the carriage member 70 in its upper position where the marking substance holder 61 is configured for loading, FIG. 12 illustrates the carriage member 70 moved back into engagement with the second end 64 of the solid marking substance 60, and FIG. 13 illustrates the carriage member 70 in its lower position after a quantity of the solid marking substance 60 has abraded onto the marking wheel 84. Movement of the carriage member 70 from the upper position to the lower position advances the first end 62 of the solid marking substance 60 out of the marking substance holder 61 and against the marking wheel 84 where it is abraded.

The carriage member 70 is slidably mounted on at least one path, thereby enabling the carriage member 70 to be longitudinally moved from the first (upper) position to the second (lower) position, and back again.

In the first exemplary tape measure 10 illustrated in the Figures, the marking device 80 optionally further comprises a controller 110 for allowing the marking device 80 to be selectively engaged or disengaged by the user. For instance, a user could disengage the marking device 80 so as to load an additional unit of solid marking substance 60 into the marking device 80. Alternatively, the user could engage or disengage the marking device 80 based upon when the user does and does not want the marking device 80 to be configured for marking the surface 100 to be measured and marked.

The controller 110 illustrated in the Figures comprises a button portion 112 connecting with the carriage member 70. The button portion 112 extending through a path 114 defined in the first side wall 22 of the housing 20. As such, the carriage member 70 is configured for longitudinal movement along the path 114 in the first direction and the second direction. A lower portion of the path 114 is generally parallel to a radial plane of the marking wheel 84. The path 114 further comprises an upper position 118 which deflects generally upwards (towards the top wall 26), and backwards (away from front wall 32). Preferably, the path 114 terminates in a downwardly oriented lock position 120. Because the lock position 120 is downwardly oriented, the downward force exerted by the constant force spring 76 will serve to hold the button portion 112 in the lock position 120 until further moved by the user.

The button portion 112, by extending through the first side wall 22 of the housing 20, is provided for manual manipulation by a user of the tape measure 10, allowing such a user the ability, by manually sliding the button portion 112 in the second direction along said path 114, to move the carriage member 70 away from engagement with the solid marking substance 60 and into a disengaged mode. In the disengaged mode, the marking device 80 is no longer engaged.

Further, when in the disengaged mode, the ram 74 of the carriage member 70 is withdrawn from the marking substance holder 61 via a port 55 defined in the marking substance holder 61. Withdrawing the ram 74 from the marking substance holder 61 allows a user to insert an additional unit of solid marking substance 60 through the upper opening 66 and into the marking substance holder 61, thereby refilling the marking substance holder 61 with additional solid marking substance 60. To reengage the marking device 80, the user can move the button portion 112 from the lock position 120 through the upper position 118 and back in to the lower position 116, causing the ram 74 to pass through the port 55 and back into the marking substance holder 61.

It is preferred that an exemplary tape measure also comprise a lock portion 44, as illustrated in FIGS. 1 through 3. The lock portion 44 for enabling the coiled measuring tape 40 to be locked in a particular position by a user of the tape measure 10. This lock portion 44 has a button section 46 that protrudes to from the exterior of the housing 20. Tape measure locking devices are known in the prior art. If an exemplary tape measure is desired to have a locking device, a skilled artisan will be able to select an appropriate locking device for the tape measure in a particular embodiment based on various considerations, including the intended use of the tape measure, the intended arena within which the tape measure will be used, and the equipment and/or accessories with which the tape measure is intended to be used, among other considerations.

The use of such a lock portion is completely optional, and exemplary tape measures will not have decreased functionality in the absence such a lock portion. This is due to the fact that the preferred marking device is directional, thereby enabling a user to create generally a straight-line mark generally perpendicular to the axis of the length of the coiled measuring tape. Thus, once the marking device is placed against the surface to be marked at the location of the mark to be made, the tape measure itself does not need to be locked into place (and could even be retracted).

As to a further discussion of the manner of usage and operation of the present invention, the same should be apparent from the above description. Accordingly, no further discussion relating to the manner of usage and operation will be provided.

A third exemplary marking tape measure comprises a housing, a coiled measuring tape having measuring indicia thereon, and a marking device. The coiled measuring tape terminating at a first end in a tape tip configured for hooking onto an edge of the surface, and has a length defining an axis. The housing comprising a plurality of walls defining an enclosure for holding the coiled measuring tape. The plurality of walls comprising a front wall having a tape blade aperture defined therethrough for allowing the coiled measuring tape to be extended. The housing comprising a marking substance holder configured for holding at least one unit of a solid marking substance. The marking device comprising a carriage member configured for longitudinal movement along a path in a first direction and a second direction. The marking device comprising a marking wheel configured for abrading the solid marking substance and creating a mark on a surface to be marked. The marking device further comprising a constant force spring having a coiled end portion and a free end portion, wherein the free end portion attaches to the carriage member, and the coiled end portion attaches to the housing. Wherein, side-to-side movement of the housing at a desired location on the surface results in the marking device making a mark on the surface which is generally perpendicular to the axis of the length of the coiled measuring tape.

The third exemplary marking tape measure can further comprise one or more of the following additional features in the following paragraphs.

The carriage member can be slidably mounted on at least one path, thereby enabling the carriage member to be longitudinally moved from a first position to a second position, and back again. The coiled measuring tape can comprise an elongated blade formed of a ribbon of metal coiled on a spool. The elongated blade can be retractable through use of a spring mechanism. The housing can further comprise an indicator viewer that is in alignment with the marking device.

The marking substance holder can comprise an elongated vertical sleeve having top end and a bottom end, the top end open at an upper opening for receiving additional units of marking substance therethrough, the bottom end open at a bottom opening adjacent the marking wheel. The marking substance holder can comprise a side wall having a length. The side wall can comprise a longitudinal track defined through at least a portion of the length of the side wall.

The marking substance having a first end and a second end, where the first end is configured for contacting the marking wheel. The abrasion of the first end against the marking wheel results in core material being transferred to a marking surface of the marking wheel, and wherein as the marking wheel rotates the marking surface contacts the surface to be marked, and core material on the marking surface is transferred to the surface resulting in a mark on the surface.

Preferably, at least a portion of the marking substance is held under tension against the surface of the marking wheel. The marking wheel has an aperture which is configured for receiving an axle therein. The marking wheel configured for rotation on the axle.

The path is generally parallel to a radial plane of the marking wheel, so that the carriage member can, through force applied by a constant force spring, apply pressure to the marking substance held against the marking wheel. The path can comprise a track defined in the marking substance holder. The carriage member can comprise an extension which extends into, and follows, the path. The carriage member, as it longitudinally moves along the path in the first direction and the second direction, draws the extension which rides in the track along the track in the first direction and the second direction. The track keeping the carriage member aligned along the path.

The path can be a passageway defined in the housing in which the carriage member can be moved longitudinally in a first direction and a second direction. The passageway can comprise a plurality of sides. The passageway can be sized to allow the carriage member to pass therethrough. The marking substance holder can comprise a side wall having a length. The side wall can comprise a longitudinal track defined through at least a portion of the length of the side wall. The carriage member can comprise an extension which is configured for insertion into the longitudinal track which is aligned with the path. The longitudinal track and the path are generally parallel to one another. The marking substance has a first end opposite a second end. The first end is configured for contacting the marking wheel, and the extension further comprising a ram configured for contacting and driving the second end of the marking substance. The ram can be located in the marking substance holder, and configured for movement in first and second directions within the marking substance holder. The constant force spring can draw the carriage member in a first direction under tension, exerting a downwards pressure in the first direction on the carriage member which is translated to the ram of the carriage member, allowing the ram to hold the marking substance under tension against the marking wheel of the marking device.

The carriage member can comprise a spring connector configured for connecting with the free end portion of the constant force spring. The coiled end portion can connect to the housing at an axle. The constant force spring is configured for being extended away from the axle and applying a force towards the axle. The plurality of walls can comprise a first side wall opposing a second side wall, and a base. The constant force spring can be configured to advance the carriage member along a longitudinal axis distally from an upper position distal from the base to lower position proximal to the base. Movement of the carriage member from the upper position to the lower position can advance the first end of the solid marking substance out of the marking substance holder and against the marking wheel where it is abraded. The marking device can comprise a controller for allowing the marking device to be selectively engaged or disengaged by a user of the marking tape measure.

The plurality of walls can comprise a first side wall opposing a second side wall, and a base. The controller can comprise a button portion connecting with the carriage member. The button portion extending through a side wall path defined in the first side wall. The carriage member is configured for longitudinal movement along the side wall path in the first direction and the second direction.

The side wall path can comprise an upper position which deflects generally upwards and backwards. The side wall path terminating in a downwardly oriented lock position.

The button portion can be configured for manual manipulation by a user of the tape measure. The user is able to slide the button portion in the second direction along the side wall path to move the carriage member from a lower position away from engagement with the solid marking substance and into a disengaged mode. The marking device is no longer engaged.

The marking substance can comprise a first end and a second end. The extension can comprise a ram configured for contacting and driving the second end of the marking substance; and wherein when in the disengaged mode. The ram is withdrawn from the marking substance holder, thereby allowing a user to insert an additional unit of solid marking substance through an opening defined in the housing, and into the marking substance holder, thereby refilling the marking substance holder.

The user can move the button portion from the disengaged mode through the upper position and back in to the lower position, thereby engaging the marking device.

It is noted that all structure and features of the various described and illustrated embodiments can be combined in any suitable configuration for inclusion in a tape measure according to a particular embodiment. For example, a tape measure according a particular embodiment can include neither, one, or both of first, second and third indicia described above.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A marking tape measure comprising:
   a housing, a coiled measuring tape having measuring indicia thereon, said coiled measuring tape terminating at a first end in a tape tip, and a marking device;
   wherein said housing comprises a plurality of walls defining an enclosure for holding said coiled measuring tape, said plurality of walls comprises a front wall having a tape blade aperture defined therethrough for allowing said coiled measuring tape to be extended;
   wherein said housing comprises a marking substance holder configured for holding at least one unit of a solid marking substance;
   wherein said coiled measuring tape has a length defining an axis;
   wherein said marking device comprises a carriage member configured for longitudinal movement along a path in a first direction and a second direction, wherein said marking device comprises a marking wheel configured for abrading said solid marking substance and creating a mark on a surface to be marked, wherein said marking device further comprises a constant force spring having a coiled end portion and a free end portion, wherein said free end portion attaches to said carriage member, and wherein said coiled end portion attaches to said housing;
   wherein said tape tip is configured for hooking onto an edge of said surface; and
   wherein side-to-side movement of said housing at a desired location on said surface results in said marking device making a mark on said surface which is generally perpendicular to said axis of the length of the coiled measuring tape.

2. The marking tape measure of claim 1, wherein said carriage member is slidably mounted on at least one path, thereby enabling the carriage member to be longitudinally moved from a first position to a second position, and back again.

3. The marking tape measure of claim 1, wherein said coiled measuring tape comprises an elongated blade formed of a ribbon of metal coiled on a spool, said elongated blade retractable through use of a spring mechanism.

4. The marking tape measure of claim 1, wherein said housing further comprises an indicator viewer that is in alignment with the marking device.

5. The marking tape measure of claim 1, wherein said marking substance holder comprises an elongated vertical sleeve having top end and a bottom end, said top end open at an upper opening for receiving additional units of marking substance therethrough, said bottom end open at a bottom opening adjacent said marking wheel.

6. The marking tape measure of claim 1, wherein said marking substance holder comprises a side wall having a length, and wherein said side wall comprises a longitudinal track defined through at least a portion of the length of said side wall.

7. The marking tape measure of claim 1, wherein said marking substance has a first end and a second end.

8. The marking tape measure of claim 7, wherein said first end is configured for contacting said marking wheel, wherein the abrasion of the first end against the marking wheel results in core material being transferred to a marking surface of the marking wheel, and wherein as the marking wheel rotates, the marking surface contacts the surface to be marked, and core material on the marking surface is transferred to the surface resulting in a mark on the surface.

9. The marking tape measure of claim 8, wherein at least a portion of said marking substance is held under tension against the surface of the marking wheel.

10. The marking tape measure of claim 1, wherein said marking wheel has an aperture which is configured for receiving an axle therein, said marking wheel configured for rotation on said axle.

11. The marking tape measure of claim 1, wherein said path is generally parallel to a radial plane of said marking wheel, so that the carriage member can, through force applied by a constant force spring, apply pressure to said marking substance held against the marking wheel.

12. The marking tape measure of claim 1, wherein said path comprises a track defined in the marking substance holder, and wherein said carriage member comprises an extension which extends into, and follows, said path.

13. The marking tape measure of claim 12, wherein said carriage member, as it longitudinally moves along the path in the first direction and the second direction, draws the extension which rides in the track along the track in the first direction and the second direction, said track keeping the carriage member aligned along said path.

14. The marking tape measure of claim 1, wherein said path is a passageway defined in the housing in which the carriage member can be moved longitudinally in a first direction and a second direction.

15. The marking tape measure of claim 14, wherein said passageway comprises a plurality of sides, said passageway sized to allow the carriage member to pass therethrough.

16. The marking tape measure of claim 15, wherein said marking substance holder comprises a side wall having a length, and wherein said side wall comprises a longitudinal track defined through at least a portion of the length of said side wall; and wherein said carriage member comprises an extension which is configured for insertion into said longitudinal track which is aligned with said path.

17. The marking tape measure of claim 16, wherein said longitudinal track and said path are generally parallel to one another.

18. The marking tape measure of claim 17, wherein said marking substance has a first end opposite a second end, wherein said first end is configured for contacting said marking wheel, and wherein said extension further comprises a ram configured for contacting and driving the second end of said marking substance.

19. The marking tape measure of claim 18, wherein said ram is located in the marking substance holder, and configured for movement in first and second directions within the marking substance holder.

20. The marking tape measure of claim 19, wherein said constant force spring draws the carriage member in a first direction under tension, exerting a downwards pressure in the first direction on the carriage member which is translated to the ram of the carriage member, allowing the ram to hold the marking substance under tension against the marking wheel of the marking device.

21. The marking tape measure of claim 1, wherein said carriage member comprises a spring connector configured for connecting with said free end portion of said constant force spring.

22. The marking tape measure of claim 1, wherein said coiled end portion connects to said housing at an axle, wherein said constant force spring is configured for being extended away from said axle and applying a force towards said axle.

23. The marking tape measure of claim 1, wherein said plurality of walls further comprises a first side wall opposing a second side wall, and a base; and wherein said constant force spring is configured to advance the carriage member along a longitudinal axis distally from an upper position distal from the base to lower position proximal to the base.

24. The marking tape measure of claim 23, wherein movement of the carriage member from the upper position to the lower position advances the first end of the solid marking substance out of the marking substance holder and against the marking wheel where it is abraded.

25. The marking tape measure of claim 1, wherein said marking device further comprises a controller for allowing the marking device to be selectively engaged or disengaged by a user of said marking tape measure.

26. The marking tape measure of claim 25, wherein said plurality of walls further comprises a first side wall opposing a second side wall, and a base; wherein said controller comprises a button portion connecting with said carriage member, said button portion extending through a side wall path defined in said first side wall; and wherein said carriage member is configured for longitudinal movement along said side wall path in the first direction and the second direction.

27. The marking tape measure of claim 26, wherein said side wall path further comprises an upper position which deflects generally upwards and backwards, said side wall path terminating in a downwardly oriented lock position.

28. The marking tape measure of claim 27, wherein said button portion is configured for manual manipulation by a user of the tape measure, wherein said user is able to slide the button portion in the second direction along said side wall path to move said carriage member from a lower position away from engagement with said solid marking substance and into a disengaged mode wherein said marking device is no longer engaged.

29. The marking tape measure of claim 28, wherein said marking substance has a first end and a second end; wherein said extension further comprises a ram configured for contacting and driving said second end of said marking substance; and wherein when in said disengaged mode, said ram is withdrawn from said marking substance holder, thereby allowing a user to insert an additional unit of solid marking substance through an opening defined in said housing, and into said marking substance holder, thereby refilling said marking substance holder.

30. The marking tape measure of claim 29, wherein said user can move said button portion from said disengaged mode through said upper position and back in to said lower position, thereby engaging said marking device.

* * * * *